United States Patent [19]

Ferro et al.

[11] 4,300,749
[45] Nov. 17, 1981

[54] THROTTLE VALVE

[75] Inventors: Anthony J. Ferro, York; Holliday L. Goldman, Red Lion, both of Pa.

[73] Assignee: Allis-Chalmers Corporation, Milwaukee, Wis.

[21] Appl. No.: 103,279

[22] Filed: Dec. 13, 1979

[51] Int. Cl.³ ............................................... F16K 1/18
[52] U.S. Cl. .................................... 251/124; 251/212; 138/45
[58] Field of Search ................... 251/212, 124; 138/45

[56] References Cited

U.S. PATENT DOCUMENTS

| 1,306,006 | 6/1919 | Gustafson | 251/212 |
| 2,587,704 | 3/1952 | Debo | 251/212 X |
| 2,740,635 | 4/1956 | O'Toole | 251/212 X |
| 2,799,468 | 7/1957 | Van Deventer | 251/124 |
| 3,160,385 | 12/1964 | Di Cesare | 251/212 X |
| 3,799,502 | 3/1974 | Baum | 251/124 |

FOREIGN PATENT DOCUMENTS 577293 6/1959 Canada ............................... 251/212

Primary Examiner—Arnold Rosenthal
Attorney, Agent, or Firm—Robert C. Jones

[57] ABSTRACT

A valve body is enlarged to contain the area of throttling vanes which are mounted on actuating shafts; the body is tapered along with the vanes to provide a loss of body area which is uniform to the throat section of the valve body; regulation of the vanes is accomplished by the shafts which extend outwardly of the valve body.

3 Claims, 4 Drawing Figures

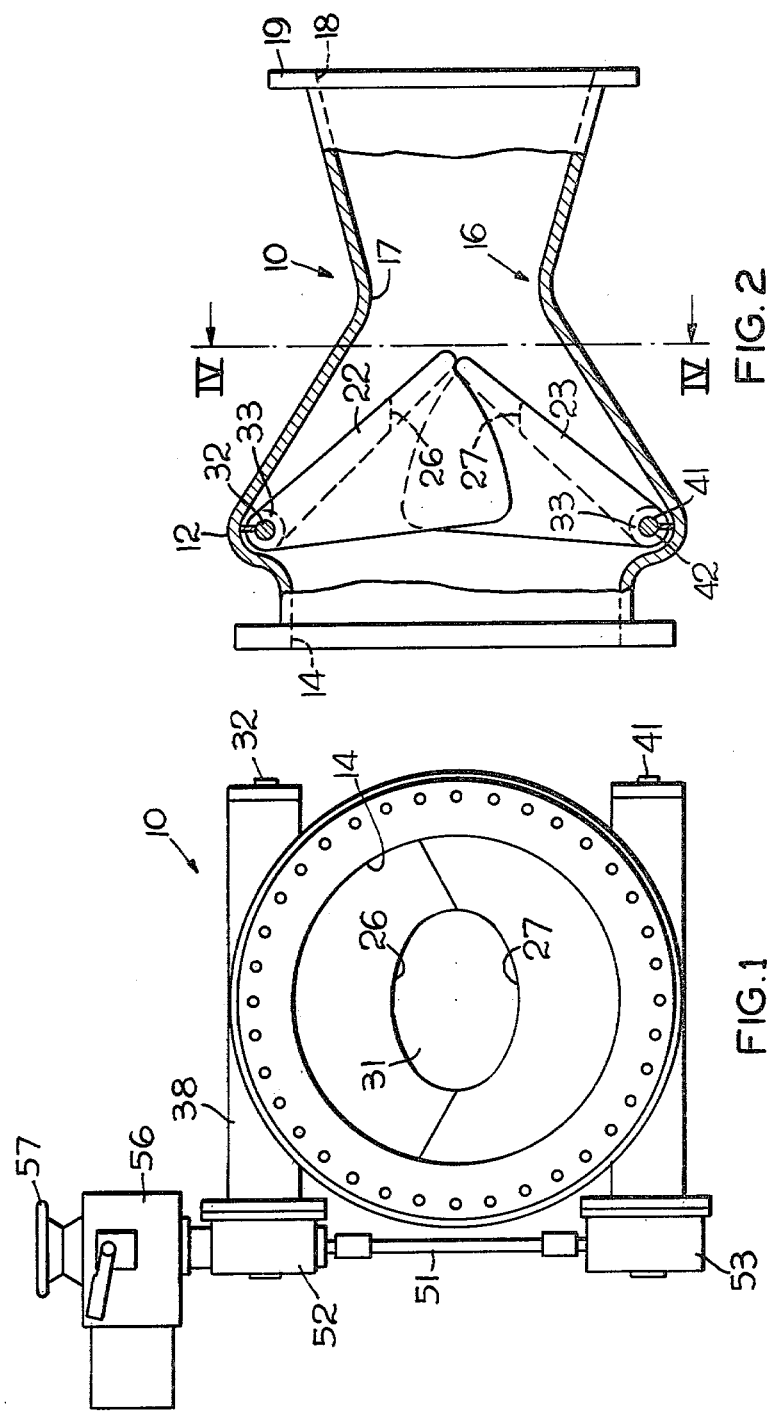

THROTTLE VALVE

BACKGROUND OF THE INVENTION

The control of fluids have in the past been usually accomplished with standard ball, butterfly, globe needle or plug valves. In effecting such fluid control, the control valves cause turbulence, cavitation, erosion, vibration and noise under certain regulating conditions. Present environmental considerations require noiseless regulation and with little or no cavitation effect. To meet the requirements, special valves, such as those with stacked plates, have been proposed but these are extremely costly.

A general object of the present invention is to provide a fluid flow regulatory valve which is simple in construction and positive in operation.

Still another object of the present invention is to provide fluid flow regulatory valve utilizing the venturi principle.

Yet another object of the present invention is to provide adjustable regulators within a valve to regulate the fluid flow therethrough.

A further object of the present invention is to provide a regulatory valve following the venturi principle of controlled flow path causing any cavitation bubbles to implode harmlessly in the flow stream.

A still further object of the present invention is to provide a fluid flow control valve having a hydraulic shape which drastically reduces the potential for cavitation thereby reducing the potential for metal removal.

SUMMARY OF THE INVENTION

The body of the valve is enlarged to contain the area of the control vanes which are selectively positionable by means of a drive shaft. The body is tapered along the vanes to provide a loss of body area which is uniform to the throat section. An increase in body area is effected from the throat section which may either be within the valve body or as an added pipeline section. The control vanes are configured to fit the contour of the internal body cavity. The tapered portion of the valve body may be varied by in angular reduction according to control requirements. The vane drive shaft is supported in trunnion bearings and shaft seals are provided to prevent leakage. Also, the joint space between the ends of the vanes adjacent the interior surface of the valve body are also provided with seals to prevent material leakage around the vanes.

DESCRIPTION OF THE DRAWINGS

FIG. 1 is an end view in elevation of the valve of the present invention as viewed from the inlet end of the valve;

FIG. 2 is a view in vertical section taken through the valve depicted in FIG. 1 showing the control vanes in a closed position;

DESCRIPTION OF THE INVENTION

Figure 3:
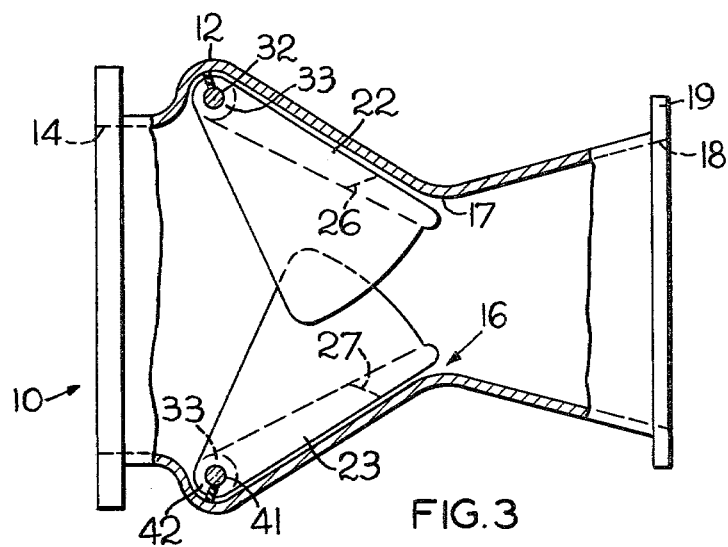
FIG. 3 is a view in vertical section through the valve showing the vanes in open position against the wall surface of the valve body; and, FIG. 4 is a section through the valve taken in a plane represented by the line IV—IV in FIG. 2 showing the mating relationship of the control vanes within the valve body and the restricted flow opening that is provided with the vanes in fully closed position.

In the drawings the reference number 10 indicates the valve of the present invention. The valve includes a cylindrical body 12 having an enlarged flanged inlet 14. The body 12 is reduced in diameter from the inlet 14 as at 16 to provide a loss in body area to provide a throat section 17. From the throat section 17, the valve body area is increased as at 18. The end of the increased body portion 18 is provided with a flange 19 and the opening therein constitutes the outlet of the valve.

Within the reduced portion 16 of the valve body there is provided a pair of control vanes 22 and 23. The vanes 22 and 23 are best described as being similar in configuration to one-half of a mollusk shell. Each of the vanes 22 and 23 conform to the interior wall surface configuration exhibiting a similar tapered configuration conforming to the taper of the interior of the valve body and in the same direction. As shown, each vane 22 and 23 has the center portion of its free end relieved as at 26 and 27, respectively. Thus, with the vanes 22 and 23 in a closed position, the relieved portions 26 and 27 of the vanes cooperate to define a restricted fluid flow opening 31 to permit a predetermined minimum of controlled flow through the valve. The provision of the minimum opening 31 with the vanes closed ensures that high velocity of the fluid is not experienced, thus preventing erosion and cavitation potential. The size of the opening 31 is preferred to be within 5 percent of the maximum area of the throat section 17.

Figure 4:
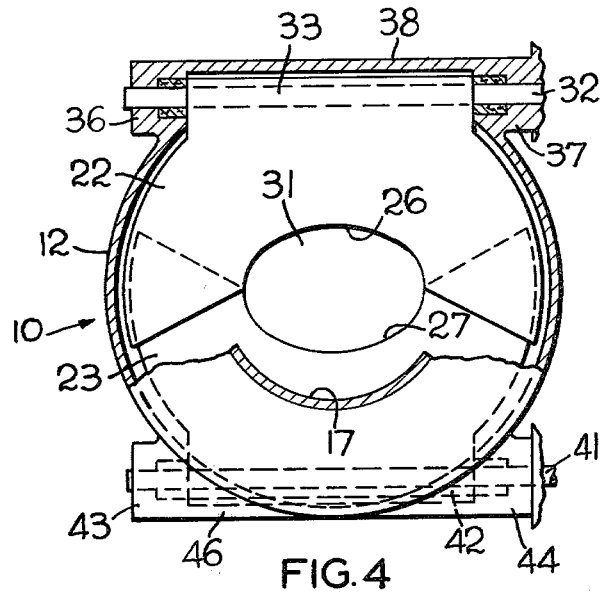

The vanes are dimensioned so that in a closed position the vane 23 fits fairly close within the vane 22 as depicted in FIG. 4. This prevents excessive fluid leakage through the lips of the vanes.

The vanes 22 and 23 are each positionable and are arranged to move simultaneously and at the same rate. To this end, a drive shaft 32 is provided and is drivenly engaged in a boss 33 formed on the inner end of the vane 22. The shaft is journalled in bosses 36 and 37 of a housing 38 formed in the valve body 12. Shaft seals are provided to prevent leakage. A similar arrangement is provided for the vane 23 wherein a shaft 41 extends through and is drivenly engaged in a boss 42 formed on the end of the vane 23. The shaft 41 is journalled in bosses 43 and 44 of a housing 46 formed in the valve body 12.

For the purpose of effecting simultaneous movement of the vanes 22 and 23, there is provided a cross shaft 51, as shown in FIG. 1. The ends of the cross shaft 51 are engaged in worm gear drive boxes 52 and 53 which operate to transfer the rotary drive of shaft 51 to the shafts 32 and 41 in a well known manner. Drive input to the shaft 51 is accomplished by means of an actuator 56, the output shaft (not shown) extends into the gear box 52 and is drivenly connected to the shaft 51. The actuator 56 herein shown is manually operable; however, it will be appreciated that a power operated actuator can be employed to good advantage. In utilizing a power actuator, a control signal will be utilized to operate the actuator rather than the manual control wheel 57 associated with the manual actuator 56.

By varying the angular position of the vanes 22 and 23, the flow of fluid through the valve is varied and the fluid follows the contour of the vanes. This control as exercised by the vanes on the fluid provides a wide range of control with no harmful cavitation.

The embodiments of the invention in which an exclusive property or privilege is claimed are defined as follows:

1. A flow control valve comprising a tubular valve body having a flow passage therethrough provided with an inlet and an outlet end, said tubular valve body being uniformly tapered in a converging and diverging fashion to form a venturi extending through the valve body from the inlet end to the outlet end of the flow passage;

fluid flow regulating means comprising a plurality of individually overlapping curved vanes constructed and arranged to conform to the interior of said valve body and in the same direction, said vanes being cooperatively arranged within said valve body to form an essentially frusto-conic assembly of said vanes defining a flow regulating orifice of variable diameter at the throat of said venturi for varying the fluid flow through said valve, said vanes being adjustably supported within said valve body in position to act upon fluid flowing through the valve body to effect a regulation of the flowing fluid;

a plurality of shafts, one for each vane, extending into the interior of said valve body transverse to the flow passage and operably connected to said vanes to effect selective simultaneous adjustment of said vane regulating means when actuated; and an actuator carried by said valve body externally thereof and operably connected to said shafts to drive said shafts wherein the vanes are selectively positioned simultaneously to effect a desired regulation of the flow of fluid through the valve.

2. A flow control valve according to claim 1 wherein said fluid control vanes are a pair of similarly configured members with the exception that one of said vanes is slightly smaller than the other to provide for interengagement of the vanes, one within the other to prevent flow leakage around the vanes.

3. A flow control valve according to claim 2 wherein the downstream ends of said vanes are relieved to provide an opening when said vanes are in closed position of substantially five percent of the maximum area of the smallest cross section of the flow through area of the valve to thereby permit a predetermined minimum of controlled flow through the valve.

* * * * *